United States Patent [19]

Baudouin

[11] Patent Number: 4,920,645

[45] Date of Patent: May 1, 1990

[54] VEGETABLE OR FRUIT PEELER

[76] Inventor: Jacques Baudouin, Les Tourelles, 07100 Rouiffieux, France

[21] Appl. No.: 312,518

[22] Filed: Feb. 21, 1989

[30] Foreign Application Priority Data

Feb. 19, 1988 [FR] France .............................. 88 02504

[51] Int. Cl.⁵ .................. B26B 3/03; B26B 11/00; B26B 29/00; B26B 1/00
[52] U.S. Cl. .................................... 30/162; 30/123.6; 30/294; 30/320
[58] Field of Search .................. 30/123.5, 123.6, 289, 30/294, 124, 162, 316, 320; 99/588; D7/187

[56] References Cited

U.S. PATENT DOCUMENTS

| | | | |
|---|---|---|---|
| 1,813,868 | 7/1931 | Smiroldo | 30/294 |
| 2,569,080 | 9/1951 | Trimble et al. | 30/162 |
| 3,009,245 | 11/1961 | Senkewitz | 30/123.6 |
| 3,889,368 | 6/1975 | Himeno | 30/294 |
| 4,348,807 | 9/1982 | Ashdown et al. | 30/123.6 |
| 4,534,348 | 8/1985 | Fedorov et al. | 30/320 |
| 4,592,140 | 6/1986 | Chasen | |
| 4,707,920 | 11/1987 | Montgomery | 30/294 |
| 4,713,885 | 12/1987 | Keklak et al. | 30/162 |

FOREIGN PATENT DOCUMENTS

| | | |
|---|---|---|
| 25457 | 1/1884 | France . |
| 638091 | 10/1936 | Netherlands . |
| 2509034 | 1/1975 | Netherlands . |

*Primary Examiner*—Douglas D. Watts
*Assistant Examiner*—Paul M. Heyrana

[57] ABSTRACT

A household utensil, in particular a fruit or vegetable peeler is composed of a handle, a cutting blade and two support bars parallel to the blade. The blade and at least one of the support bars form a unit which moves in translation towards the handle and can be retracted into the handle. The retraction of the mobile unit into the handle releases the peels wedged between the blade and the support bars. The present invention is particularly useful for peeling asparagus.

15 Claims, 2 Drawing Sheets

VEGETABLE OR FRUIT PEELER

BACKGROUND OF THE INVENTION

1. Field of the Invention

The present invention, which is in the field of household utensils, pertains to a vegetable or fruit peeler that can be used more specifically for peeling asparagus, though not exclusively for said purpose.

2. The Prior Art

Currently-used peelers are generally composed of a handle, a cutting blade and one or two bars parallel to the blade, that can be called support or guide bars, because they are intended to press against the vegetable or fruit in order to guide the utensil appropriately, while limiting the thickness of the peels.

The most conventional model of a vegetable or fruit peeler is in the form of a sort of knife, having a handle unitary with a wide inwardly-curved blade made in one piece, divided into three parallel parts by two longitudinal slits, with the center part constituting a double-edged cutting blade, and the two side parts forming support bars.

The main problem with these utensils is that the peels often remain wedged in the slit(s) between the blade and the support bar(s). This problem is especially prevalent with irregularly-shaped or fibrous peels and is thus especially common in peeling asparagus. Peels wedged in the utensil must be removed using the hand not holding the utensil, which interferes with and slows down the peeling operation.

SUMMARY OF THE INVENTION

The present invention eliminates the aforementioned problem by providing an improved vegetable or fruit peeler allowing the user to employ only the hand holding the utensil for the easy and quick removal of any peels that may become wedged.

For this purpose, the object of the invention is a vegetable or fruit peeler composed in the known manner of a handle, a cutting blade and one or two support or guide bars parallel to the blade, wherein the blade and/or at least one support or guide bar form a unit that moves in translation towards the handle, and that can be retracted into the handle, so that the retraction of the mobile unit into the handle disengages the peels wedged between the blade and the support or guide bar(s).

In this way, the utensil user can make the cutting blade and/or the one or two support bars retract into the handle, using a simple and quick motion, as often as necessary during the peeling operation, so that the wedged peels are released and fall independently, by virtue of their own weight. The mobile unit is then returned, or returns on its own through the action of a spring or another elastic return mechanism, to its normal operating position, i.e., fully extended from the handle, and the peeling operation can be resumed immediately.

More specifically, the invention provides two embodiments for vegetable or fruit peelers having a cutting blade surrounded by two support or guide bars in the known manner.

In the first embodiment, the mobile unit that can be retracted into the handle is composed of the cutting blade and the two support or guide bars.

In the second embodiment, the mobile unit comprises the cutting blade and only one of the two support or guide bars, while the other support bar remains unitary with the handle.

The two embodiments below are possible for peelers endowed with a single support or guide bar.

In the first embodiment, the mobile unit that can be retracted into the handle is composed of the cutting blade and the single support or guide bar.

In the second embodiment, the mobile unit is composed of the cutting blade alone, while the single support bar remains unitary with the handle.

Advantageously, when one support bar remains unitary with the peeler handle, the bar comprises, at its end away from the handle, a rigid end piece extending perpendicularly to the "fixed" support bar, and having a mechanism to position the mobile unit cutting blade and support bar, if one exists, when the mobile unit is in its position fully extended from the handle. In the peeler's normal operating position, this arrangement provides the unit composed of the cutting blade and the support bar(s) the rigidity needed to produce peels having a uniform thickness, given that the thin and relatively flexible nature of the support bar(s) and especially the cutting blade makes them susceptible to bending when they are pressed against a vegetable or fruit in order to peel it.

In either of the above embodiments, the mobile unit that can be retracted into the handle, composed of the cutting blade and/or at least one support or guide bar, can comprise a stop provided for the manual activation of the mobile unit, so that the latter can be retracted into the handle, with a spring being mounted inside the handle to return the mobile unit to its position fully extended from the handle. The sliding of the mobile unit in the retracting direction is thus controlled by pushing the stop of this unit with the thumb or index finger of the hand holding the utensil, the hand still holding the handle with the other fingers, without having to change the position of the grip, while the mobile unit moves. After the peels are disengaged, it suffices to release the pressure of the finger on the stop, so that the return spring housed in the handle moves the mobile unit back to its normal operating position. Right-handed or left-handed persons may use the instrument in this manner, when mobile units composed of the cutting blade and one of the two support bars are involved.

When the user moves the mobile unit composed of the cutting blade and/or one of the support or guide bars by pressing the button with one of his fingers, the reaction could cause the other fingers holding the utensil to slip on the handle in the opposite direction. In order to hold the other fingers easily in place, another fixed stop is advantageously provided on the side of the handle opposite that of the stop unitary with the mobile unit, in order to keep in place the fingers other than the one acting on the first stop. In this way, when the index finger is used to move the mobile unit in translation, the second stop unitary with the handle will keep the thumb of the same hand, which tends to move in the opposite direction, in the proper position.

In another embodiment of the invention, the mobile unit that can be retracted into the handle, composed of the cutting blade and/or at least one support or guide bar, comprises a mechanical connection with a lever mounted pivotally on the handle, so that pressure exerted on the lever, towards or away from the handle, moves the mobile unit to its regular operating position, fully extended from the handle, or to its position retracted into the handle.

According to an initial option, the mobile unit is connected to a fixed point on the handle by means of a toggle lever composed of two rocker bars interconnected by an intermediary hinge pressing against the aforementioned lever, so that pressure exerted on the lever moving it towards the handle causes the mobile unit to move outside of the handle to its normal operating position, while a spring is mounted inside the handle to move the mobile unit to its retracted position inside the handle. In this case, the user can move the mobile unit to its operating position through the intermediary of the toggle lever, against the action of the spring, by pressing the lever with one of his fingers. To prevent the user from exerting constant pressure on the lever during the peeling operation, a small catch is preferably placed on the handle to hold the lever when the latter is placed against the handle. When the user wishes to remove the peels, he lifts the catch, which releases the lever and allows the spring to retract the mobile unit, with the toggle lever in this case displacing so as to move the handle lever away. A small wheel is advantageously provided at the intermediary hinge of the toggle lever to facilitate the latter's sliding on the lever when the mobile unit moves.

In one alternative, the mobile unit and the lever are mechanically connected by a wire, one end of which is attached to the mobile unit, passing over a first fixed pulley located towards the rear end of the handle, then over a second mobile pulley, held by the lever, and the other end of which is attached to the handle at a point so that, when the lever is moved away from the handle, the wire sliding or rolling over the pulleys moves the mobile unit into the handle, with a spring being mounted inside the handle to return the mobile unit to its position fully extended from the handle. The mobile unit is thus retracted into the handle by exerting traction on said unit through the intermediary of a wire selected so as to be sufficiently sturdy and flexible.

BRIEF DESCRIPTION OF THE DRAWINGS

In any event, the invention will be more clearly understood through the description below, with reference to the attached schematic drawings illustrating a few embodiments of the vegetable or fruit peeler, given as non-restrictive examples, in which.

DETAILED DESCRIPTION OF THE PREFERRED EMBODIMENTS

Figure 1:
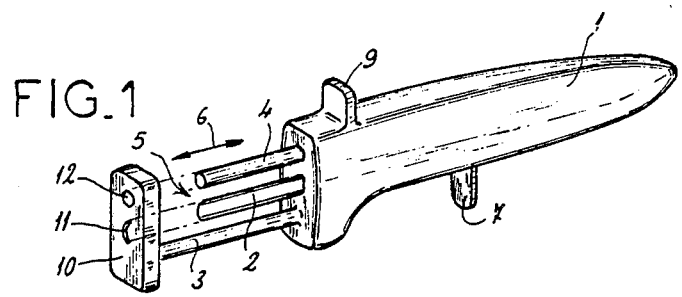
FIG. 1 is a perspective view of an initial embodiment of a peeler according to the present invention.

In all embodiments shown in the drawings, the vegetable or fruit peeler comprises a handle 1, a cutting blade 2 and, on either side of blade 2, two support bars, respectively 3 and 4, parallel to each other and to blade 2. First of all, concentrating exclusively on FIGS. 1 to 7, one of the support bars 3 is attached securely to handle 1, with the other support bar 4 and blade 2 forming a retractable mobile unit 5 that can be moved in translation in the longitudinal direction of handle 1 as shown by double arrow 6, and can be retracted into the handle 1, the latter being hollow so that it can accommodate and guide mobile unit 5.

Figure 2:
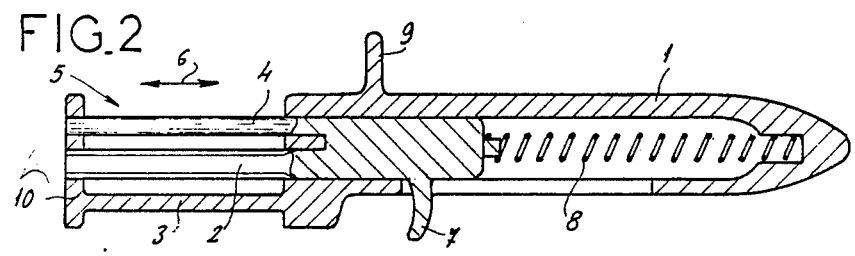
FIG. 2 is highly schematic cross section showing the mechanism of the peeler in FIG. 1.

In the embodiment shown in FIGS. 1 and 2, the mobile unit 5 composed of blade 2 and support bar 4 also comprises in its rear part a side stop 7 so that it can be activated manually by the thumb or index finger of the hand holding the utensil. Mobile unit 5 may thus be pulled back and retracted, against the action of return spring 8 housed in handle 1, which returns mobile unit 5 to its normal operating position, fully extended from handle 1. Handle 1 bears another stop 9 on the side opposite the first stop 7, to hold the fingers other than the one acting on said first stop 7, and thus prevent the hand from slipping.

As shown primarily in FIG. 1, at its end away from handle 1, fixed support bar 3 bears a rigid end piece 10 which extends perpendicularly to the fixed support bar 3. End piece 10 contains two openings or grooves 11 and 12, provided to accommodate respectively the free ends of blade 2 and support bar 4 of mobile unit 5, when the latter is in its position fully extended from handle 1. This reinforces the peeler, preventing cutting blade 2 and support bar 4 from bending undesirably in the utensil's regular operating position.

When the utensil is in use, and when peels are wedged between blade 2 and either of the two support bars 3 and 4, it suffices to retract mobile unit 5 into handle 1 by acting on button 7, in order to release the peels, Which are then removed by the simple effect of gravity, being stopped by the "fixed" wall located at the end of handle 1, through which mobile unit 5 passes. Next, by releasing stop 7, return spring 8 is allowed to move mobile unit 5 back to its operating position so that the peeling in progress can continue.

Figure 3:
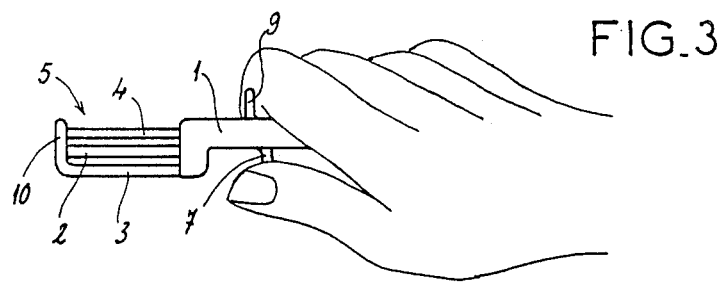
FIGS. 3 and 4 illustrate the use of the peeler in FIGS. 1 and 2 by a right-handed person.
Figure 4:
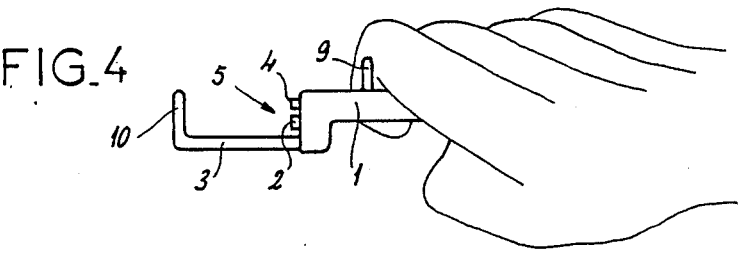
Figure 5:
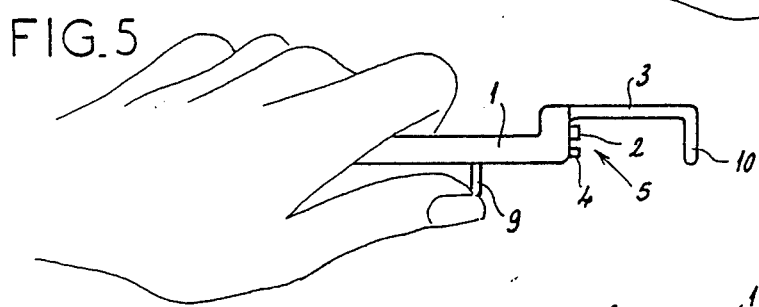
FIG. 5 illustrates the use of the same peeler by a left-handed person.

FIGS. 3 and 4 illustrate the use of the peeler described above by a right-handed person, successively showing the normal operating position and the retracted position for removing the peels. FIG. 5 illustrates the same peeler held by a left-handed person.

Figure 6:
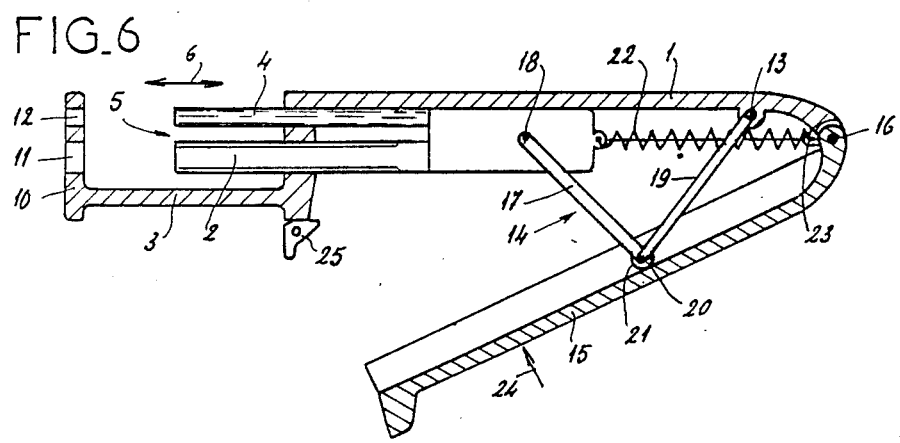
FIG. 6 is a view of a second embodiment of the invention, similar to FIG. 2.

FIG. 6 shows another embodiment, which also comprises a mobile unit 5 that can be retracted into handle 1, composed of cutting blade 2 and one 4 of the two support bars 3 and 4. The rear part of mobile unit 5 in this case is connected to a fixed point 13 of handle 1 located in the median area thereof, by a toggle lever 14, which cooperates with a lever 15 hinging on handle 1 at point 16, located at the rear end of the handle 1.

More specifically, toggle lever 14 comprises a first rocker bar 17 hinging at point 18 on mobile unit 5, and a second rocker bar 19 hinging at point 13 on handle 1, with the two rocker bars 17 and 19 being interconnected by intermediary hinge 20. A small wheel 21, provided at intermediary hinge 20, presses against one surface of lever 15, rolling on this surface.

Spring 22 stretched between the rear end of mobile unit 5 and a fixed point 23 of handle 1 causes mobile unit 5 to retract into handle 1. Conversely, pressure exerted on lever 15 in the direction of arrow 24, thus moving lever 15 towards handle 1, causes mobile unit 5 to move to its position fully extended from handle 1, through the intermediary of toggle lever 14. A small catch 25 is provided to hold lever 15 in its position closest to handle 1, corresponding to the position mobile unit 5 occupies during the normal operation of the peeler.

In this case, when wedged peels are to be removed, lever 15 must be released by lifting catch 25. The action of spring 22 then causes mobile unit 5 to retract into the handle. At the same time, toggle lever 14 moves lever 15 away from handle 1. Next, a simple push on lever 15 in the direction of arrow 24 moves the lever against handle 1 and returns mobile unit 5 to operating position.

Figure 7:
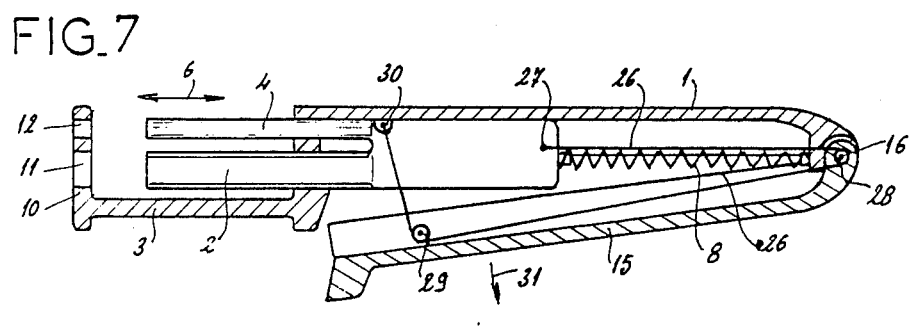
FIG. 7 is a view similar to those preceding, illustrating an alternative version of the peeler in FIG. 6.

In one alternative illustrated in FIG. 7, mobile unit 5 is connected mechanically to lever 15, still hinged at 16 to the rear end of handle 1 by means of a solid, flexible wire running along a path indicated by a solid line. A first end of wire 26 is attached to the rear part of mobile unit 5 at point 27. Past attachment point 27, wire 26 first extends parallel to handle 1, and runs over a first fixed pulley 28 located at the rear end of handle 1, at hinge 16 of lever 15. Wire 26 next follows the direction of lever 15, and passes over a second mobile pulley 29, held by lever 15. The other end of wire 26 is attached to handle 1 at a fixed point 30 located in the front of said handle 1.

In this case, return spring 8 housed inside handle 1 acts on mobile unit 5 as in the first embodiment described, i.e., it pushes said mobile unit 5 back to its normal operating position, fully extended from handle 1. A position of lever 15 brought towards handle 1, corresponds to the position of mobile unit 5, by means of the connection provided by wire 26. As in the preceding embodiment, a small catch 25 can hold lever 15 in said position.

To remove wedged peels, if necessary, the user releases lever 15, exerting traction according to arrow 31 on the lever 15, moving lever 15 away from handle 1. By sliding or rolling over the two pulleys 28 and 29, wire 26 then pulls mobile unit 5 into handle 1, thus causing the mobile unit 5 to retract. As soon as lever 15 is released, return spring 8 can bring mobile unit 5 back to its extended position, with lever 15 being moved back against handle 1.

Figure 8:
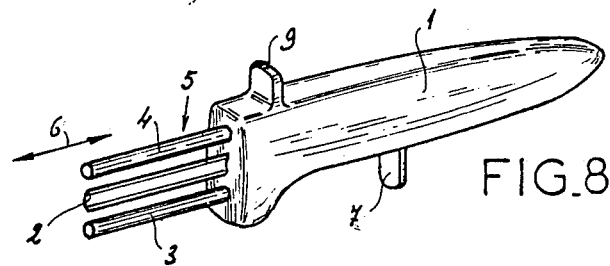
FIG. 8 is a perspective view of a last embodiment of the peeler.
Figure 9:
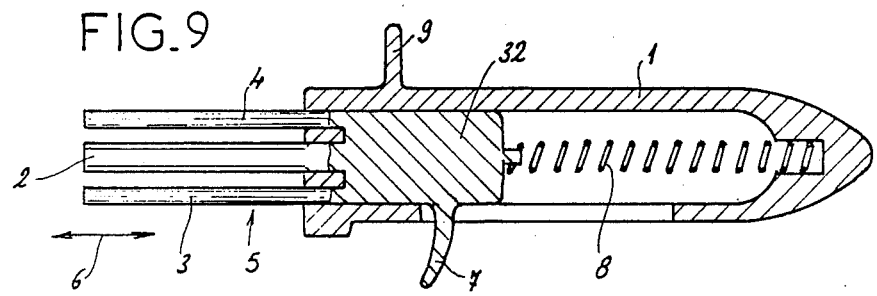
FIG. 9 is a longitudinal cross section of the peeler in FIG. 8.

FIGS. 8 and 9 show yet another embodiment wherein cutting blade 2 and the two support bars 3 and 4 surrounding said blade 2 are all mobile and can be retracted simultaneously into handle 1. Mobile unit 5 is thus composed of blade 2 and the two bars 3 and 4, interconnected by a block 32 mounted slidingly inside the hollow part of handle 1, which also houses return spring 8. As in the first embodiment, in this case again, mobile unit 5 comprises a stop 7 so that said unit can be pulled backwards, against the action of spring 8, to release the peels.

Of course, the invention is not limited solely to the embodiments of said vegetable or fruit peeler described as examples above; on the contrary, it encompasses all alternative embodiments and applications following the same principle. Thus, the peeler can also be designed in particular with a cutting blade and a single support bar, and, in this case, the single support bar may be either unitary with the handle, so that the mobile unit is limited to the blade, or unitary with the blade, so as to constitute the mobile unit together with the blade. Alternatively, the mobile assembly may be constituted by the support bar, whereas the cutting blade is integral with the handle. Further, in the case where the peeler comprises two support bars, the mobile assembly can be constituted by the two support bars, where the cutting blade is integral with the handle.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A fruit or vegetable peeler, comprising:
   a handle;
   a cutting blade;
   at least one guide bar parallel to said blade,
   a unit consisting of said cutting blade and said at least one spaced guide bar having means for moving the unit in translation towards said handle to selectively retract said unit into said handle to release peels wedged between said blade and said guide bars.

2. The fruit or vegetable peeler of claim 1, wherein said guide bar comprises two guide bars surrounding said cutting blade.

3. A fruit or vegetable peeler, comprising: a handle; a cutting blade; according to claim 1, wherein said at least one guide bars comprises two guide bars parallel to and surrounding said cutting blade; and means for moving said unit in translation towards said handle, said unit being retractable into said handle, and having one of said guide bars in fixed relationship with said handle.

4. The fruit or vegetable peeler; of claim 3, wherein said guide bar in unitary relationship with said handle bears a rigid end piece at an end spaced from said handle extending perpendicularly to said unitary guide bar and comprises mechanisms to position said cutting blade and said guide bar of said unit, when said unit occupies a position fully extended from said handle.

5. The fruit or vegetable peeler of claim 4, wherein said positioning mechanisms provided on said end piece held by the unitary guide bar comprises openings formed in said end piece to accommodate free ends of said cutting blade and said guide bar of said unit, when said unit occupies a position fully extended from said handle.

6. The fruit or vegetable peeler of claim 4, wherein said positioning mechanism provided on said end piece held by the unitary guide bar comprises openings formed in said end piece to accommodate free ends of said spaced cutting blade and said guide bar of said unit, when said unit occupies a position fully extended from said handle.

7. The fruit or vegetable peeler of claim 1, wherein said guide bar comprises a single guide bar, and wherein said unit that is retractable into said handle comprises the cutting blade and a single spaced guide bar.

8. The fruit or vegetable peeler of claim 1, wherein said unit that is retractable into said handle comprises at least one cutting blade and at least one spaced guide bar, comprises first stop means for the manual retraction of said unit into said handle, and further comprises a spring mounted inside said handle to return said unit to a position fully extended from said handle.

9. The fruit or vegetable peeler of claim 8, wherein a second fixed stop means is provided on a side of said handle opposite that of said stop means unitary with said unit, in order to hold fingers other than those acting on said first stop means.

10. The fruit or vegetable peeler of claim 1, wherein said unit that is retractable into said handle comprises at least one cutting blade and at least one spaced guide bar and further comprises a mechanical connection with a first lever mounted pivotally on said handle so that pressure exerted on said first lever to move it towards or away from said handle moves said unit to its normal operating position fully extended from said handle or to its position retracted into said handle.

11. The fruit or vegetable peeler of claim 10, wherein said unit is connected to a fixed point of said handle by a toggle lever composed of two rocker bars interconnected by an intermediary hinge pressing on said first lever so that pressure on said first lever to move it towards said handle causes said unit to move out of said handle to its normal operating position, and a spring is mounted inside said handle to retract said unit into said handle.

12. The fruit or vegetable peeler of claim 11, further comprising a small catch for holding said first lever when the lever is brought against said handle and mounted on said handle.

13. The fruit or vegetable peeler of claim 12, wherein a small wheel is provided at the intermediary hinge of said toggle lever to facilitate sliding of said hinge on said first lever when said unit moves.

14. The fruit or vegetable peeler of claim 12, wherein a small wheel is provided at the intermediary hinge of said toggle lever to facilitate sliding of said hinge on said first lever when said unit moves.

15. The fruit or vegetable peeler of claim 10, wherein said mechanical connection between said unit and said first lever is provided by a wire, one end of which is attached to said unit and passes over a first fixed pulley located towards a rear end of said handle, then over a second mobile pulley held by said first lever, and a second end of said wire is attached to said handle at a point so that, when said first lever is moved away from said handle, said wire sliding or rolling over said pulleys pulls said unit into said handle, and a spring inside said handle is mounted to return said unit to a position fully extended from said handle.

* * * * *